No. 832,429. PATENTED OCT. 2, 1906.
J. W. STACEY.
CONVERTIBLE MIXING AND CLEANING MACHINE.
APPLICATION FILED APR. 18, 1906.
2 SHEETS—SHEET 1.
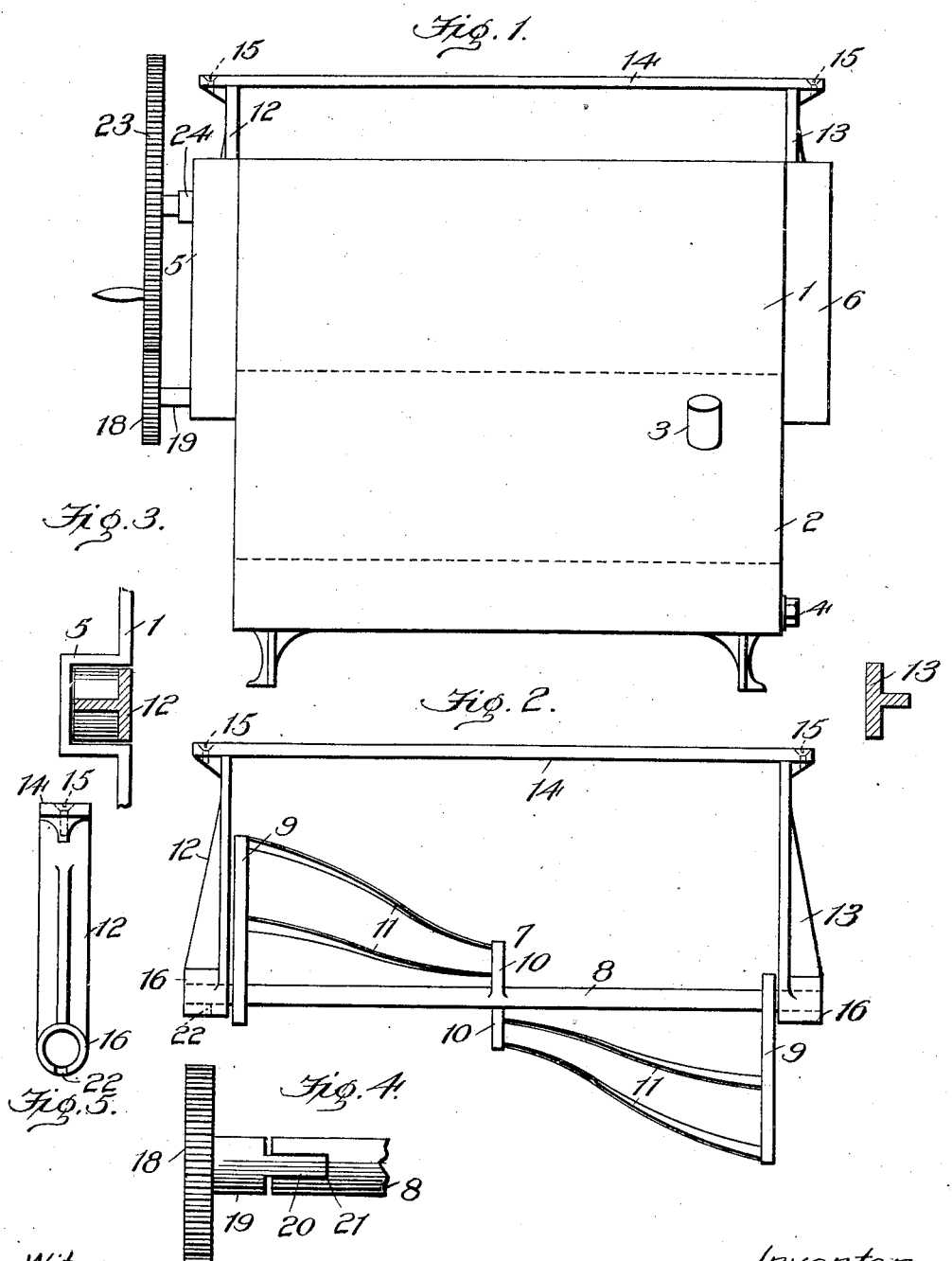
Witnesses
E. Wallington
Frank W. Marlow
Inventor
J. W. Stacey,
By A. D. Jackson
Attorney.

No. 832,429. PATENTED OCT. 2, 1906.
J. W. STACEY.
CONVERTIBLE MIXING AND CLEANING MACHINE.
APPLICATION FILED APR. 18, 1906.
2 SHEETS—SHEET 2.
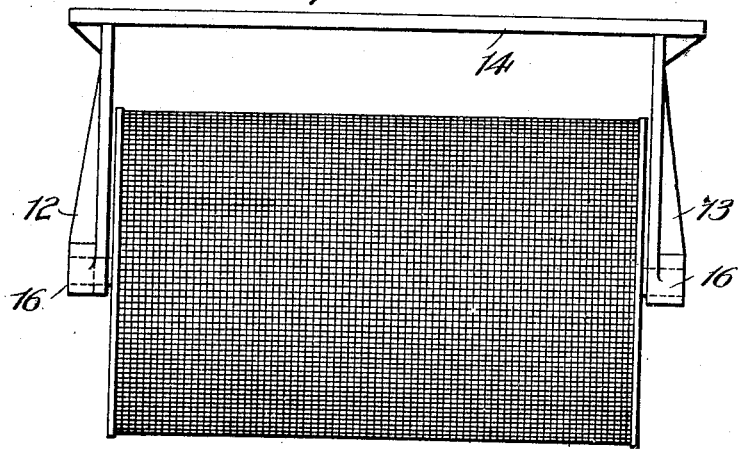
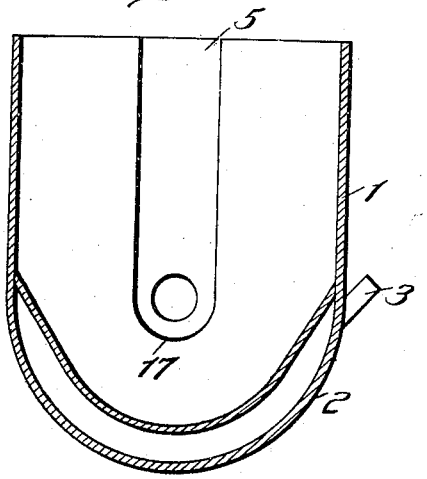

UNITED STATES PATENT OFFICE.

JOHN W. STACEY, OF DALLAS, TEXAS.

CONVERTIBLE MIXING AND CLEANING MACHINE.

No. 832,429.  Specification of Letters Patent.  Patented Oct. 2, 1906.

Application filed April 18, 1906. Serial No. 312,490.

*To all whom it may concern:*

Be it known that I, JOHN W. STACEY, a citizen of the United States, residing at Dallas, Texas, have invented certain new and useful Improvements in Convertible Mixing and Cleaning Machines, of which the following is a specification.

This invention relates to mixing and beating and cleaning machines; and the object is to produce machines which are adapted for beating eggs, whipping cream, mixing and beating dough or batter, and for cleaning such articles as currants or raisins.

One of the advantages of this machine is that different forms of beaters or mixing devices may be used in the machine and the gearing of the machine is entirely separated from dough or batter or other article which may be placed in the machine.

Other objects and advantages will be fully explained in the following description, and the invention will be more particulary pointed out in the claims.

Reference is had to the accompanying drawings, which form a part of this application and specification.

Figure 1 is a side elevation of the machine, showing the hanger for the beater partly raised and indicating the water-tank which partly surrounds the lower part of the machine. Fig. 2 is a side elevation of one of the beaters and a hanger therefor. Fig. 3 is a broken sectional view illustrating the vertical ways and the position of the hangers relative to said ways. Fig. 4 is a detail view illustrating the connection of a beater-shaft with the shaft of the drive-wheel. Fig. 5 is an end elevation of a hanger, showing the slot in the bottom of the bearing to receive the tongue of the driving-wheel shaft. Fig. 6 is a side elevation of a cylindrical screen which constitutes a cleaning device. Fig. 7 is a vertical cross-section of the casing with the beater removed.

Similar characters of reference are used to indicate the same parts throughout the several views.

This machine has a suitable casing or receptacle 1 to contain the articles to be treated. This box may be rectangular or any other suitable shape. The lower part of the machine is incased in a jacket 2, which is to contain water or some liquid to maintain a suitable temperature. In winter warm water would be necessary. In summer cool water would be necessary for some articles. A nozzle 3 is provided for pouring in water, and an opening is provded for drawing out the water, and this opening may be closed by a screw-cap 4. Vertical ways 5 and 6 are formed at each end of the casing 1. Beaters are provided for agitating material placed in the receptacle 1. The beaters 7 consist of a shaft 8, side arms 9, central arms 10, and bars 11 for beating. The shaft 8 is journaled in hangers 12 and 13. The hangers 12 and 13 extend up even with the top of the casing or higher or lower, if necessary, and a bail 14 is attached to the hangers by screws 15. The hangers are T-shaped in cross-section for the greater part of their length. The inner sides of the hangers must be wide enough to fill the vertical ways 5 and 6, so that when the hangers are let down in the receptacle in operative position the inner parts of the hangers will complete a smooth inner wall with the inner face of the receptacle 1, as shown at Fig. 3. In this manner batter or dough is prevented from entering the ways 5 and 6. Thus the inner faces of the hangers are flush with the inner faces of the walls of the receptacle 1. The hangers 12 and 13 have bearings 16, which rest on the bottom 17 of the ways 5 and 6. The shaft 8 is driven by a gear-wheel 18, which has a shaft 19. The shaft 19 couples with the shaft 8 by means of a tongue 20 and a groove 21 in the shaft 8. A slot 22 is made in the bottom of the bearing 16 sufficiently long to allow the tongue 20 to pass up in the bearing to engage the groove 21. When the hangers, with the beaters, are let down into operative position, the tongue 20 and the groove 21 must be arranged vertically, so that the groove 21 will receive the tongue 20. The wheel 18 is driven by a gear-wheel 23. The wheel 23 has its shaft journaled in a bearing 24.

Fig. 6 illustrates a cylindrical agitator, which is interchangeable with beaters which may be used in the receptacle 1 and may be constructed of wire screen. Currants and like articles may be placed within the cylinder and water placed in the receptacle 1, so that when the cylinder is revolved by the gearing the currants or other articles will be thoroughly washed by the water. The bail 14 is removable by reason of the screws which attach it to the hangers. Thus the machine herein described may be used for beating dough, batter, or whipping cream, or for cleaning currants and like articles.

Having fully described my invention, what

I claim as new, and desire to secure by Letters Patent, is—

1. A mixing and cleaning machine having a receptacle provided with vertical ways in the ends thereof, hangers for beating and cleaning devices mounted in said ways, a bail attached to the tops of said hangers, said hangers having journal-bearings resting on the bottom of said ways for the journals of beating and cleaning devices, said hangers being as wide as said ways, and the inner faces of said hangers forming smooth surfaces flush with the inner faces of said receptacle whereby dough or other material is prevented from entering said ways, beating and cleaning devices journaled in said hangers, and means for rotating said beating and cleaning devices.

2. A mixing-machine having a suitable receptacle, vertical ways in the ends of said receptacle, hangers mounted in said ways and closing said ways, agitating devices journaled in said hangers, said hangers having journals resting on the bottom of said ways, a driving-shaft having a tongue-and-groove connection with the shaft of an agitating device, one of said ways having a bearing for said driving-shaft and one of said hanger-journals having a slot to receive the tongue of said driving-shaft, and means for driving said shafts.

In testimony whereof I set my hand, in the presence of two witnesses, this 27th day of March, 1906.

JOHN W. STACEY.

Witnesses:
C. COLLINS,
A. L. JACKSON.